US006775763B2

(12) United States Patent
Sexton et al.

(10) Patent No.: US 6,775,763 B2
(45) Date of Patent: Aug. 10, 2004

(54) BYTECODE INSTRUCTION PROCESSOR WITH SWITCH INSTRUCTION HANDLING LOGIC

(75) Inventors: Bonnie C. Sexton, Cary, NC (US); Loren B. Reiss, Raleigh, NC (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 711 days.

(21) Appl. No.: 09/802,594

(22) Filed: Mar. 9, 2001

(65) Prior Publication Data

US 2002/0184479 A1 Dec. 5, 2002

(51) Int. Cl.[7] .............................................. G06F 9/455
(52) U.S. Cl. ....................................... 712/227; 703/26
(58) Field of Search ............................. 712/227; 703/26

(56) References Cited

U.S. PATENT DOCUMENTS

| 5,937,193 | A |   | 8/1999  | Evoy        |         |
|-----------|---|---|---------|-------------|---------|
| 5,953,741 | A |   | 9/1999  | Evoy et al. |         |
| 6,002,874 | A | * | 12/1999 | Bahrs et al. | 717/157 |
| 6,076,141 | A |   | 6/2000  | Tremblay    |         |
| 6,085,307 | A |   | 7/2000  | Evoy et al. |         |
| 6,477,702 | B1| * | 11/2002 | Yellin et al. | 717/126 |

OTHER PUBLICATIONS

Lindholm, Tim et al., *The Java Virtual Machine Specification* (2nd Ed.), Chapters 6 and 7, (1999).
"Vulcan Machines' Moon Processor Core", Powerpoint Presentation, Vulcan Machines Ltd., (electronic file dated Oct. 12, 2000).
*Moon v. 1.2 Data Sheet*, Vulcan Machines Ltd. (Sep. 14, 2000).
*JSTAR: Practical Java Acceleration for Information Appliances*, Nazomi Communications, (Nov. 4, 2000).
*JEDI Technologies' Acceleration Engine Opens New Markets for Using Java Technology in Embedded Devices*, JEDI Technologies, (Mar. 13, 2000).
*JSTAR Product Brief*, Nazomi Communications (as early as Nov. 4, 2000).
Sale A: "The Implementation of Case Statements in Pascal" Software Practice and Experience, John Wiley & Sons, Ltd, GB, vol. 11, No. 9, Sep. 1, 1981, pp. 929–942, XP002040457 ISSN: 0038–0644 the whole document.

* cited by examiner

Primary Examiner—William M. Treat
(74) Attorney, Agent, or Firm—Peter Zawilski

(57) ABSTRACT

A circuit arrangement and method facilitate the execution of switch instructions such as Java lookupswitch and tableswitch instructions in hardware through emulation of such instructions using a plurality of conditional branch instructions from the same instruction set as the switch instructions, and which are capable of being directly implemented in hardware. The conditional branch instructions are typically generated by switch instruction handling logic and passed to execution logic capable of natively executing the conditional branch instructions. By emulating a complex switch instruction in switch instruction handling logic using a plurality of conditional branch instructions from the same instruction set, often the amount of custom circuitry needed to fully support a complex switch instruction is substantially reduced from what would be required to natively support the switch instruction in the execution logic of a hardware processor. Moreover, compared to software emulation, which typically requires passing control to a software interpreter, the overhead associated with emulating a switch instruction in the instruction fetch logic using multiple conditional branch instructions capable of being natively executed by execution logic offers substantial gains in performance.

24 Claims, 4 Drawing Sheets

BYTECODE INSTRUCTION PROCESSOR WITH SWITCH INSTRUCTION HANDLING LOGIC

FIELD OF THE INVENTION

The invention is generally related to integrated circuit device design and architecture, and in particular, to the processing of switch instructions on a bytecode instruction processor.

BACKGROUND OF THE INVENTION

Platform-independent programming languages, such as the "Java" programming language from Sun Microsystems, Inc. offer significant advantages over traditional, platform-specific languages. A platform-independent programming language typically utilizes platform-independent program code (machine-readable instructions) suitable for execution on multiple hardware platforms without regard for the particular instruction set for the hardware platforms. A hardware platform typically includes a computer system having one or more processors (e.g., microprocessors or microcontrollers) which execute a particular set of instructions having a specific format, sometimes referred to as a native instruction set. This is in contrast to platform-specific languages, which utilize platform-specific compilers to generate program code that is native to one particular hardware platform. While the same source code may in some instances be compiled by different platform-specific compilers into suitable program code for multiple platforms, the resulting program code is not platform-independent.

In many environments, platform-independent program codes are in an intermediate code format, since further processing is required to execute such codes on a specific hardware platform. For Java, for example, the intermediate codes are referred to as bytecodes. Typically, a compiler is used to generate a series of intermediate codes from a source file. The intermediate codes are then executed by a software interpreter (known as a Java Virtual Machine (JVM)) that converts them into native instructions for the computer system on the fly. Consequently, the intermediate codes are executable on any computer system having a suitable platform-independent program code interpreter.

Many platform-independent program codes are typically relatively compact, which makes them readily suited for downloading over a network or modem. Moreover, since the program code is platform-independent, the downloading computer system (or server) can download the same program code irrespective of the particular hardware platform of the executing computer system (or client). Consequently, platform-independent program codes such as Java have begun to enjoy immense popularity for the distribution of software programs over the Internet. Typically, platform-independent software programs downloaded from the Internet are in the form of applets which execute within a web browser. It should be understood, however, that platform-independent program codes have many other uses, including in stand-alone applications, operating systems, and real-time embedded systems, among others.

One problem with platform-independent program code, however, is that the program code often must be interpreted during run time, which significantly reduces execution speed compared to program code native to a particular hardware platform. Some JVM's, for example, may require up to 50 processor clock cycles to process each bytecode, compared to typically one clock cycle for most native instructions.

As an alternative to run time interpretation, software-based just-in-time (JIT) compilers have been developed to optimize interpretation of platform-independent program code, typically by emulating the functionality of the platform-independent code using native code. While execution speed is increased over simple runtime interpretation, the platform-independent program code is still slower than native code, and additional memory space is required to store the compiler code.

At the other extreme, dedicated stand-alone Java processors have been proposed to utilize platform-independent instructions as their native instruction set. While these processors have the capability of running platform-independent program code as fast as other native program codes for other hardware platforms, the processors suffer from the same problems as any other processor when executing non-native program code.

It has also been proposed to combine a native instruction processor with a Java coprocessor or a hardware translation circuit to accelerate the processing of Java bytecodes. In the former instance, a Java coprocessor will typically be under the control of a native processor, and will be called upon whenever Java program code needs to be executed. In the latter instance, a translation circuit will attempt to capture Java bytecodes and translate the bytecodes into native instructions so that, when Java program code is requested by a native processor, the instructions returned to the native processor in response to the request will be in a format native to the processor.

In either instance, often only a subset of the Java bytecodes are supported by the coprocessor or hardware translation circuit, typically due to the complexities and additional circuitry that would otherwise be required to support all of the Java bytecode instruction set. Java is a stack-based language, which is often difficult to efficiently implement in hardware. Moreover, some of the more complex instructions would require an inordinate amount of custom circuitry to be implemented in hardware considering their relatively infrequent occurrence in typical Java computer programs. For each instruction, a tradeoff inherently exists between the additional cost of implementing the instruction in hardware and the additional gain in performance that would be achieved.

For instructions that are not directly implemented in hardware, typically a JVM executing on the native processor handles those instructions, often with a significant performance penalty. To handle a non-implemented instruction in a coprocessor arrangement, for example, control must be passed from the coprocessor to the native processor, the instruction must be interpreted by the JVM executing on the native processor, and control must be returned to the Java processor.

Consequently, a significant need exists in the art for a manner of implementing as many Java bytecode instructions in hardware as possible, thus minimizing the frequency of instructions requiring JVM interpretation.

One particular type of instruction that is difficult to implement in hardware is a switch instruction. Java, for example, supports two types of switch instructions, a lookupswitch instruction and a tableswitch instruction, each of which operates in a similar manner of a "case" statement supported by many programming languages.

For example, a lookupswitch instruction typically includes a number of match-offset pairs that define a plurality of tests that are applied to a key value that has been pushed onto the stack prior to the instruction. Each match-offset pair includes a match value that the key value is compared to, and an associated offset value that is used to calculate a target address that is jumped to whenever a match occurs with the associated match value. To execute this instruction the JVM pops the key off the stack and compares it to each match value. If the key is equal to one of the match values, the JVM calculates a target address by adding the offset associated with the matching match value to the address of the lookupswitch bytecode. The JVM jumps to the target address and continues execution there. If none of the match values are equal to the key, the JVM jumps to a default target address that is also specified by the lookupswitch instruction.

A tableswitch instruction is similar to a lookupswitch instruction, except that rather than specifying match-offset pairs, a range of match values is specified by low and high values defined by the instruction. A list of offset values, equal to the number of match values defined in the range, is also specified by the instruction. To execute this instruction the JVM pops the key off the operand stack and compares it to the low and high values, and uses an offset value corresponding to the matching value in the specified range to calculate the target address that is jumped to by the JVM. If the key is less than the low value and greater than the high value, a default offset, also specified by the instruction, is used to calculate the target address.

Both types of Java switch instructions are difficult to implement in hardware, as both are variable in length, and both require a substantial amount of processing to perform the sequential tests that are needed to fully implement the instructions. Thus, often these types of instructions are executed by passing control to a software JVM, thereby increasing the processing overhead of such instructions and decreasing system performance.

Therefore, a substantial need exists in the art for a manner of improving the performance of a data processing system in executing switch instructions such as Java lookupswitch and tableswitch bytecode instructions.

SUMMARY OF THE INVENTION

The invention addresses these and other problems associated with the prior art by providing a circuit arrangement and method that facilitate the execution of switch instructions such as Java lookupswitch and tableswitch instructions in hardware through emulation of such instructions using a plurality of conditional branch instructions from the same instruction set as the switch instructions, and which are capable of being directly implemented in hardware. The conditional branch instructions are typically generated by switch instruction handling logic (which may be implemented within the instruction fetch logic) and passed to execution logic capable of natively executing the conditional branch instructions.

By emulating a complex switch instruction in switch instruction handling logic using a plurality of conditional branch instructions from the same instruction set, often the amount of custom circuitry needed to fully support a complex switch instruction is substantially reduced from what would be required to natively support the switch instruction in the execution logic of a hardware processor. Moreover, compared to software emulation, which typically requires passing control to a software interpreter, the overhead associated with emulating a switch instruction in the instruction fetch logic using multiple conditional branch instructions capable of being natively executed by execution logic offers substantial gains in performance.

In one embodiment consistent with the invention, for example, Java lookupswitch and tableswitch instructions are emulated by generating a plurality of Java ifeq bytecode instructions in instruction fetch logic for execution by execution logic that natively supports ifeq bytecode instructions. Moreover, to simplify stack management, one or more dup bytecode instructions are also generated to duplicate the key value for a lookupswitch or tableswitch instruction on the stack so that the key value is available for each ifeq bytecode instruction. An unconditional branch instruction, e.g., a goto_w bytecode instruction, may also be generated to emulate the default branch of a lookupswitch or tableswitch instruction.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

The illustrated embodiments of the invention accelerate the processing of complex switch instructions in a bytecode instruction processor such as a Java-compatible processor or coprocessor through the emulation of such switch instructions using multiple conditional branch instructions.

The embodiments discussed hereinafter focus on the emulation of Java tableswitch and lookupswitch bytecode instructions in hardware, using conditional branch instructions such as ifeq bytecode instructions from the Java instruction set, coupled with additional support instructions such as Java dup instructions and goto_w instructions, as will become more apparent below. Moreover, the embodiments discussed hereinafter utilize execution logic that is customized to handle the emulated tableswitch and lookupswitch instructions, albeit with substantially less custom circuitry than would otherwise be required to directly implement hardware execution of the tableswitch and lookupswitch instructions themselves.

It will be appreciated by one of ordinary skill in the art having the benefit of the instant disclosure, however, that the hardware-based switch instruction emulation discussed herein may be utilized to emulate switch instructions in other programming environments incorporating instruction sets capable of being executed at least partially in hardware (i.e., where at least a subset of the instructions from the instructions sets are capable of being directly executed by hardware), including, for example, intermediate and/or platform-independent instruction sets other than Java bytecodes. It will also be appreciated by one of ordinary skill in the art having the benefit of the instant disclosure that other Java instructions may be used to emulate switch instructions than that disclosed herein. Moreover, execution logic may be customized in other manners than that disclosed herein to support hardware-based switch instruction emulation, or may not be customized at all to support hardware-based switch instruction. Rather all the customized circuitry may be resident elsewhere in a hardware design, e.g., in the instruction fetch and/or dispatch logic.

Figure 1:
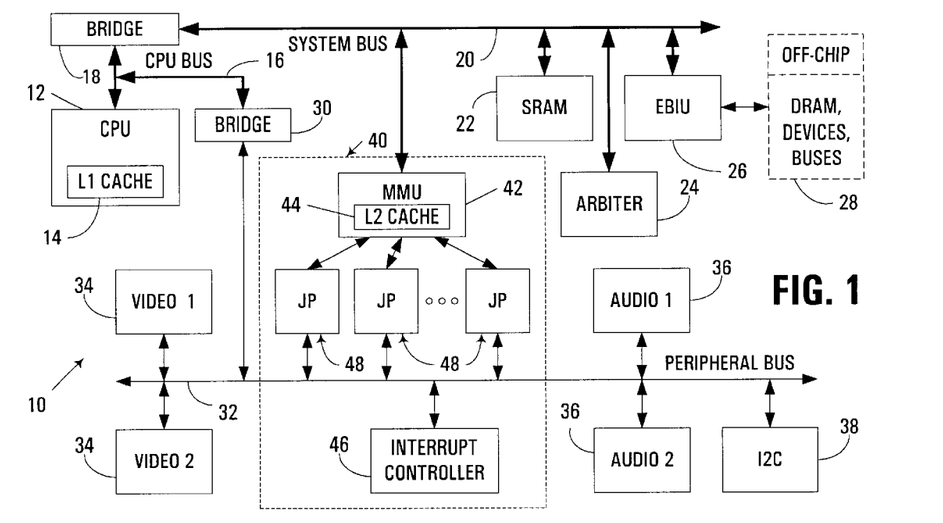
FIG. 1 is a block diagram of a data processing system implementing hardware-based switch instruction emulation consistent with the invention.

Turning to the drawings, wherein like numbers denote like parts throughout the several views, FIG. 1 illustrates a data processing system 10 incorporating hardware-based switch instruction emulation consistent with the invention. In the illustrated embodiment, data processing system 10 is implemented using a single integrated circuit device, or chip, including all of the components shown in FIG. 1, with the exception of the off-chip components 28. The integrated circuit device implements an embedded system-on-chip (SOC) environment. Within the circuit arrangement is a multi-processor arrangement including a master processor or CPU 12 implemented, for example, as a RISC processor core such as an ARM, MIPS or PowerPC processor core. Processor 12 typically includes one or more levels of cache memory, e.g., a primary (L1) cache 14. A CPU bus 16 couples processor 12 via a bridge 18 to a system bus 20 including a number of components such as SRAM 22, bus arbiter 24 and an external bus interface unit (EBIU) 26 for use in coupling the system bus to one or more off-chip devices 28, e.g., DRAM, external buses, external devices, etc.

CPU bus 16 also couples processor 12 via a bridge 30 to a peripheral bus 32, e.g., to interface the processor with a number of application-specific cores such as video processing cores 34, audio processing cores 36, and I2C core 38. System bus 20 is typically a high speed bus for performing performance-critical operations, and is typically based upon the particular architecture of the processor 12. Peripheral bus 32, on the other hand, is typically a lower speed bus, e.g., a VLSI peripheral bus (VBP) for use in accessing registers in the various cores coupled to the bus.

Hardware-based Java acceleration is implemented via a Java accelerator circuit arrangement 40 including a memory management unit (MMU) 42 with a secondary (L2) cache 44, an interrupt controller 46 and one or more Java processor cores 48. Memory management unit 42 is coupled to system bus 20, and performs various data management activities with the memory, including managing Java objects, performing garbage collection, and managing memory accesses. MMU 42 may also handle conventional paging of memory to a slower, virtual memory system.

Interrupt controller 46 implements hardware-based interrupt processing, and is coupled to peripheral bus 32. Interrupt controller 46 generally operates by capturing interrupts independent of any processor and handling the interrupts if possible to minimize interruptions to the processors.

Each Java processor core 48 is also coupled to peripheral bus 32, as well as to MMU 42 via a direct high speed point-to-point connection.

It will be appreciated that the functionality implemented in MMU 42 and interrupt controller 46 may be handled by conventional memory management and/or interrupt devices, or partially or completely within software in the other embodiments. Moreover, it will be appreciated that any number of Java processor cores 48 may be utilized in various embodiments. Other system architectures and data processing environments may also be used, e.g., that shown in FIG. 7 (discussed in greater detail below). Moreover, additional devices may be disposed on the integrated circuit device incorporating CPU 12 and Java processors 48, e.g., embedded DRAM, other application-specific cores, etc. Moreover, the various components shown in FIG. 1 may be disposed on multiple integrated circuit devices in the alternative.

Other modifications will be apparent to one of ordinary skill in the art.

Hardware-based switch instruction emulation consistent with the invention is typically implemented in a circuit arrangement for a processor, coprocessor or other programmable integrated circuit device such as a system-on-chip (SOC) device, and it should be appreciated that a wide variety of programmable devices may utilize the various features disclosed herein. Moreover, as is well known in the art, integrated circuit devices are typically designed and fabricated using one or more computer data files, referred to herein as hardware definition programs, that define the layout of the circuit arrangements on the devices. The programs are typically generated by a design tool and are subsequently used during manufacturing to create the layout masks that define the circuit arrangements applied to a semiconductor wafer. Typically, the programs are provided in a predefined format using a hardware definition language (HDL) such as VHDL, verilog, EDIF, etc. While the invention has and hereinafter will be described in the context of circuit arrangements implemented in fully functioning integrated circuit devices and data processing systems utilizing such devices, those skilled in the art will appreciate that circuit arrangements consistent with the invention are capable of being distributed as program products in a variety of forms, and that the invention applies equally regardless of the particular type of signal bearing media used to actually carry out the distribution. Examples of signal bearing media include but are not limited to recordable type media such as volatile and non-volatile memory devices, floppy disks, hard disk drives, CD-ROM's, and DVD's, among others and transmission type media such as digital and analog communications links.

Figure 2:
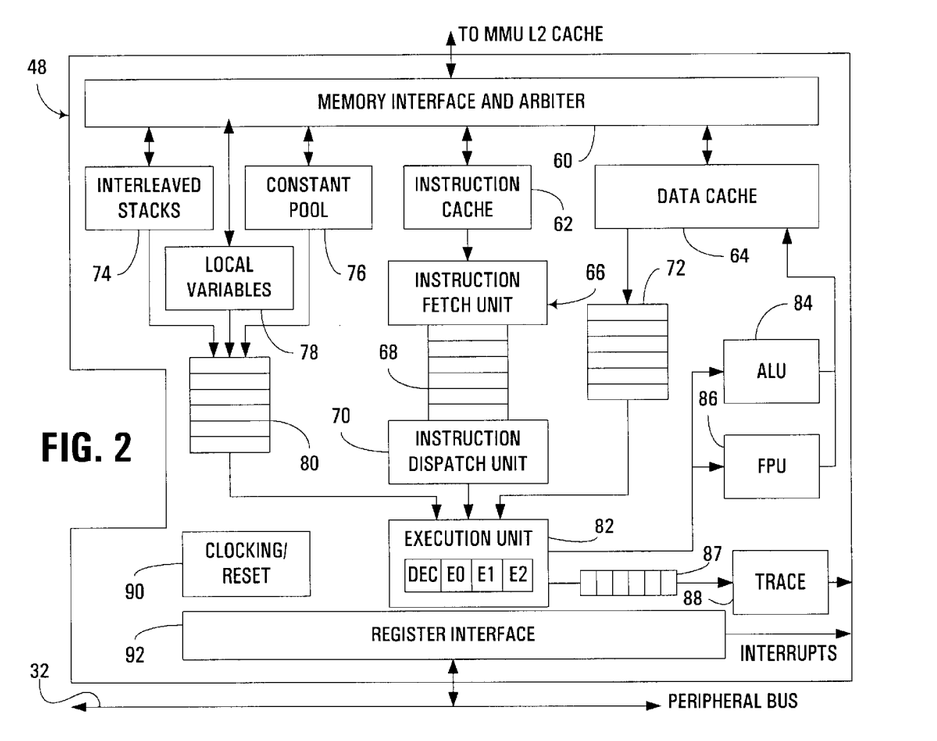
FIG. 2 is a block diagram of a Java processor from the data processing system of FIG. 1.

FIG. 2 illustrates each Java processor core 48 in greater detail. Interface with system memory is provided via a memory interface and arbiter block 60 coupled directly to the L2 cache of MMU 42 (FIG. 1). Instruction and data streams are respectively cached in an instruction cache 62 and data cache 64 coupled to the memory interface and arbiter block 60. Instructions received into the instruction cache 62 are passed to an instruction fetch unit 66 which feeds a multi-stage instruction queue 68 coupled to an instruction dispatch unit 70.

Data maintained in data cache 64 is likewise fed to a data queue 72 for use in connection with execution of the instructions queued in instruction queue 68. Moreover, to implement a Java execution environment, additional internal data for a Java Virtual Machine is stored in blocks 74, 76 and 78, all of which feed a second data queue 80. Block 74 stores the various stacks relied upon by a Java Virtual Machine, while block 76 stores a pool of constants. Block 78 stores local variables for a current method being executed by the Java processor (including a method address as will be discussed below).

It may be desirable in some applications to implement a stack in block 74 using a multi-port memory structure, so that multiple stack operations may be performed in a given cycle. For example, it may be desirable to support a 4-port memory that permits four stack operations to occur in a particular cycle. Doing so facilitates the execution of multiple instructions per cycle. The implementation of a multi-port memory structure to support such functionality would be within the ability of one of ordinary skill in the art having the benefit of the instant disclosure.

Each of queues 72 and 80, as well as instruction dispatch unit 70, feed an execution unit 82 that processes the instructions and associated data. Execution unit 82 is shown as a four stage execution unit including stages DEC, E0, E1 and E2, although other execution unit configurations may be used in the alternative.

As with a number of conventional architectures, execution unit 82 utilizes an arithmetic logic unit (ALU) 84 and a floating point unit (FPU) 86, each of which writes data back into data cache 64. In addition, a trace block 88 is coupled to execution unit 82 through a queue 87 to provide debugging capability for the circuit. Clocking and reset circuitry is illustrated in block 90, as is a register interface 92 coupled to peripheral bus 32. Register interface block 92 is also capable of outputting one or more interrupt signals that are detected and handled by interrupt controller 46 (FIG. 1).

Figure 3:
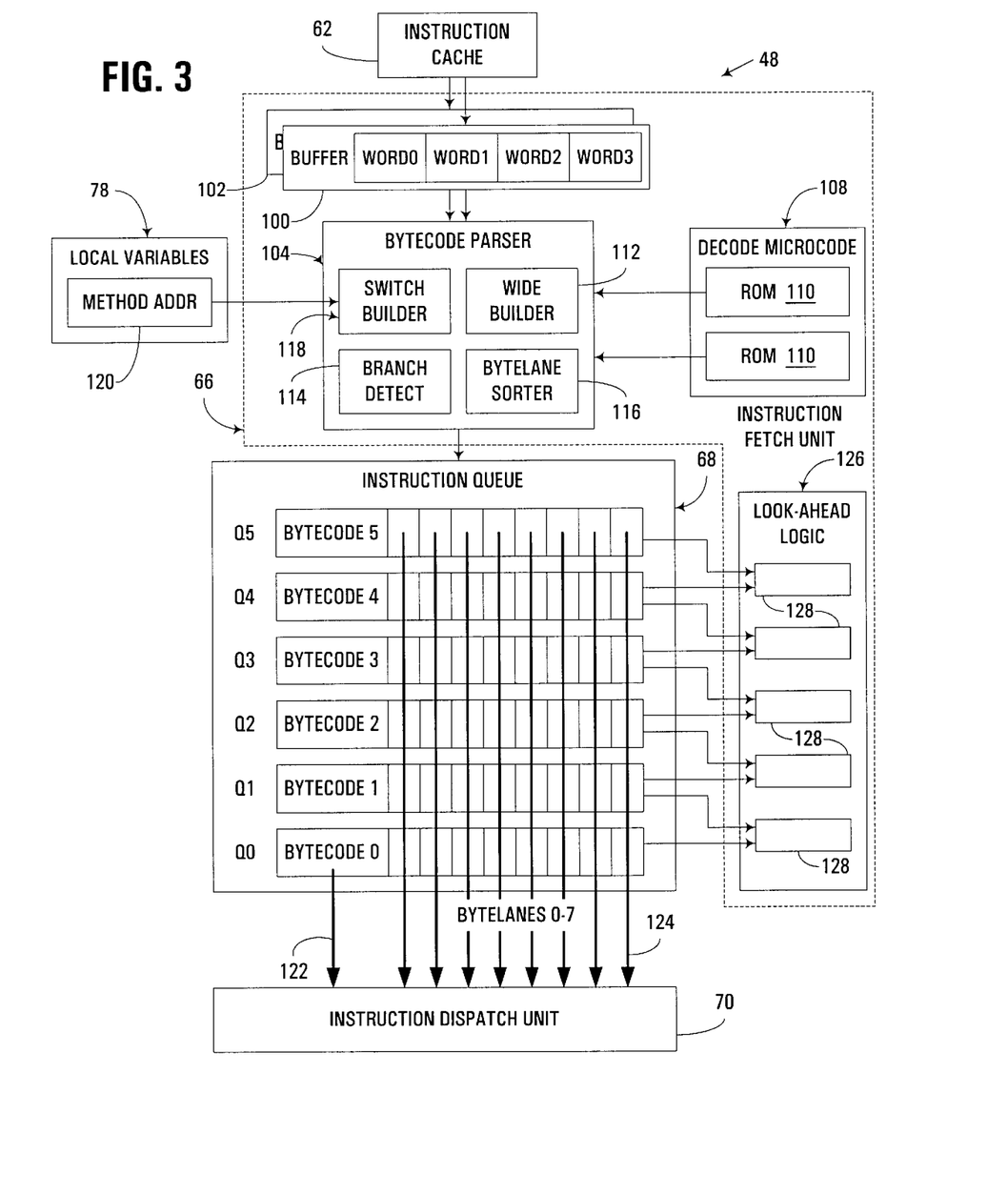
FIG. 3 is a block diagram of the principal instruction fetch and dispatch circuitry in the Java processor of FIG. 2, including switch builder logic used in hardware-based switch instruction emulation consistent with the invention.

FIG. 3 illustrates the instruction handling logic in Java processor 48 in greater detail. Specifically, instruction fetch unit 66, as well as the instruction queue 68, are broken out to illustrate the principal logic components that implement the instruction handling logic described herein.

The instruction handling logic in Java processor 48 generally maintains an N-stage queue 68 and uses look-ahead combinational logic to find sequences that can be optimized. In the illustrated embodiment, the queue is six stages in length. Each queue element Q0–Q5 includes a register arranged within a bytecode lane 122, and zero to eight registers arranged into a plurality of byte lanes 124 to store arguments or operands for use in executing the instructions passed through bytecode lane 122. A pair of ping pong buffers 100, 102 are continually filled from the instruction cache unit (ICU) 62 so that, as one buffer 100, 102 is being parsed by a bytecode parser 104, another buffer 100, 102 is being filled.

Bytecode parser 104 looks at pairs of instructions and does a lookup from a decode microcode 108 including a pair of identical ROM's 110. By providing a pair of ROM's 110 containing decode microcode, bytecode parser 104 is capable of concurrently identifying and placing two instructions in queue 66 at a time. The bytecode lane 122 and bytelanes 124 of queue 68 output to instruction dispatch unit or logic 70 for dispatch to the execution unit or logic (not shown in FIG. 3).

Each buffer 100, 102 is typically 128 bits (4 32-bit words) in length, and equal to the cache line width of instruction cache 62, although other sizes may be used in the alternative. Further, instruction queue 68 is six stages in length, and 9 bytes in width, although other lengths and/or widths may be used in the alternative. Queue 68 is desirably long enough to enable some degree of look-ahead and look-behind processing in the instruction stream, e.g., by look-ahead logic 126, which includes a plurality of logic blocks 128 coupled to various stages of the queue.

Moreover, each ROM 110 typically includes decode signals used to assist in selectively routing appropriate data associated with a bytecode instruction to a bytelane for use by the execution unit when executing a bytecode instruction (e.g., 256 8-bit entries, one for each bytecode). As an example, parsing of an iload instruction may result in the generation of a decode signal to route the byte following the bytecode instruction (the index value expected by the execution unit) to bytelane 0 in the instruction queue. Microcode instructions may be stored in logic other than a ROM (e.g., a PLA or register), and may not need to be duplicated in other embodiments. However, by providing duplicate lookup, bytecode parser 104 is able to process multiple instructions in a clock cycle to prevent the execution logic from becoming starved due to insufficient instruction data in the queue.

Bytecode parser 104 may include various functional blocks to provide various performance enhancements over basic instruction decoding. For example, a wide builder block 112 may be used to process Java wide bytecodes to extend local variable indexes with additional bytes. Likewise, a branch detect block 114 may be used to provide branch prediction capabilities, and bytelane sorter block 116 may be used to interpret the decode logic to route appropriate data to the various bytelanes, which can substantially simplify the execution logic based upon the known routing of data for particular bytecodes.

In addition, to perform hardware-based switch instruction emulation, a switch builder block 118 is provided in bytecode parser to detect and handle the "jump" class of Java bytecode instructions, representing the various switch-type instructions supported by the Java environment (e.g., lookupswitch and tableswitch). Among other data, block 104 receives a method address variable 120 from the stored local variables 78 to provide a base address from which target addresses may be generated by a processed switch instruction.

Prior to discussing hardware-based switch instruction emulation in block 118, however, a brief discussion of wide builder block 112 and look-ahead logic 126 is provided.

Wide Builder

The Java wide bytecode extends a local variable index with additional bytes. To accelerate processing of this type of instruction, block 112 may be used to specially handle these instructions so that, when a wide bytecode is encountered, the instruction will be pre-processed before placing it in the queue. There are two instruction formats for the wide bytecode:

Format 1: wide, <opcode>, indexbyte 1, indexbyte 2; where <opcode> is any of: iload, fload, aload, lload, dload, istore, fstore, astore, lstore, destore, or ret.

Format 2: wide, iinc, indexbyte 1, indexbyte 2, constbyte 1, constibyte 2.

In general, the wide bytecode modifies the bytecode that immediately follows it by extending the modified bytecode's unsigned 8-bit local variable index to an unsigned 16-bit index. If the bytecode following wide is iinc, both the iinc bytecode's local variable index and its increment are extended by an extra byte.

To accelerate processing of a wide bytecode-modified instruction, block 112 may be configured to fill the bytelanes with the extended data, and then notify the execution logic that the bytecode is wide-modified (e.g., via a "wide" bit, or via a unique bytecode). The execution logic would then only need be modified to process the instruction using the extended data, a minimal customization from the execution logic for a non-wide-modified instance of the instruction.

Thus, for example, to an instruction stream including a wide instruction followed by an iinc instruction, block 112 may be configured to combine the wide and iinc instructions into a new bytecode: iinc_mod, which has the same value as iinc but the decode microcode that reflects the modification. Block 112 would place the iinc bytecode value of 0x84 in the bytecode lane and notify the bytelane sorter 116 to place 4 operands into bytelanes 0–3 of the queue. In addition, a wide bit may be set to notify the execution logic of the presence of wide data in the bytelanes. Through suitable configuration of the execution logic, detection of assertion of the "wide" bit in connection with the 0x84 bytecode would trigger processing the bytecode as a wide instruction.

As another example, to process a wide bytecode followed by an iload bytecode, block 112 may be configured to combine the wide and iload instructions into a new bytecode: iload_mod, which has the same value as iload but decode microcode that reflects the modification. Block 112 would place the iload bytecode value of 0x15 in the bytecode lane and notify the bytelane sorter 116 to place two operands into bytelanes 0–1 of the queue. In addition, a wide bit may be set to notify the execution logic of the presence of wide data in the bytelanes. Through suitable configuration of the execution logic, detection of assertion of the "wide" bit in connection with the 0x15 bytecode would trigger processing the bytecode as a wide instruction.

Other wide-modified bytecodes would be processed in a similar manner, and the modifications to execution logic to support such functionality would be understood by one of ordinary skill in the art having the benefit of the instant disclosure. In addition, wide bytecode preprocessing may not be used in some embodiments.

Look-Ahead Logic

Instruction fetch unit or logic 66 may also include look-ahead logic 126 that examines the instruction queue 68 and determines if stack operations or ALU operations may be optimized, and/or if instructions have resource constraints. This often enables the execution unit to execute more than one instruction at a time, i.e., superscalar operation.

Superscalar operation requires the presence of at least two instructions in the queue. If superscalar operation takes place, it occurs via the passage of a second instruction from the instruction queue through decode and dispatched to the execution logic. Thus, one purpose of the look ahead logic is to look for stack optimizations, ALU optimizations and resource constraints and report these to the instruction dispatch unit 70.

Stack Operation Optimization

A stack may be configured to handle 4 word operations per cycle. All instructions that use the stack may therefore be examined by the look ahead logic and combined when possible to maximize stack usage.

For example, multiple stack operations may be combined into a larger instruction. Take, for example, a bytecode stream including four signed integer pushes: SIPUSH 0x0003, SIPUSH 0x0002, SIPUSH 0x0001, and SIPUSH 0x000. Instead of processing these instructions in four sequential cycles, the look-ahead logic may be configured to combine these instructions into a single PUSH instruction, e.g., PUSH 0x00000000 0x00000001 0x00000002 0x00000003, with the bytelanes 0–7 filled with the appropriate values to push. Through customization of the execution logic, and through provision of a decode signal that identifies the number of values to push, the execution logic may be configured to push up to four values onto the stack within the same clock cycle. As a result, a substantial performance improvement may be obtained.

As another example, stack operations may be combined with other related bytecodes for concurrent execution. Take, for example, a bytecode stream including the bytecodes: SIPUSH 0x0000, SIPUSH 0x0001, SIPUSH 0x0002, and AASTORE, which would normally be executed in four cycles. Detection of this combination of instructions by the look-ahead logic may result in the generation of a new extended instruction for processing by the execution logic, e.g.:

AASTORE 0x00000002 0x00000001 0x00000000, which could be executed by suitable execution logic within a single cycle. For example, the execution logic may be configured to bypass the stack and operate directly on the three operands in the extended AASTORE instruction, thus handling the instructions in a single cycle.

As yet another example, stack operations may be combined with other, unrelated instructions. Consider, for example, a bytecode stream including a Double to Long (D2L) bytecode and two pushes: D2L, BIPUSH 0x0001, and BIPUSH 0x0000, which would normally execute in six cycles. Detection of this combination of instructions by the look-ahead logic may result in the generation of a new instruction for processing by the execution logic, e.g.:

D2PUSH 0x00000000 0x00000001, which could be executed in two cycles using suitable execution logic. In a first cycle, the two values for the D2L bytecode would be popped from the stack. Then, in the second cycle, the values would be converted and pushed onto the stack along with the two arguments for the push bytecodes.

ALU Operation Optimization

The ALU may include duplicate functionality to handle multiple words (e.g., up to four words) at a time for one or two operations. It may be desirable, for example, to configure the ALU to perform two operations on integers or one operation on a double or float. The look-ahead logic may therefore be configured to determine if bytecodes can be combined to maximize ALU usage.

Consider, for example, a bytecode stream for two integer adds:

| | | |
|---|---|---|
| IADD | (Two pops, two's complement add, one push) | 3 + n cycles |
| IADD | (Two pops, two's complement add, one push) | 3 + n cycles | where n is the number of cycles required to perform the arithmetic operation.

To accelerate processing of these instructions, the look-ahead logic may be configured to generate the following instructions for dispatch to the execution unit:

| | | |
|---|---|---|
| POP | val1 val2 val3 val4 | (pop all four at once in 1 cycle) |
| IADD | val1 val2 val3 val4 | (send two sets of integers to ALU in n cycles) |
| PUSH | result1 result2 | (push both results in 1 cycle) |

Through suitable configuration of the execution logic, the time to execute this stream of instructions may be reduced from $6+2*n$ cycles to $2+n$ cycles. Both ADD operations would be done in parallel, so they would take a total of n cycles.

Resource Constraints Optimization

In order for instructions to go superscalar (executing with another) they must not interfere with one another. Access to various resources like the data cache memory or the local variable memory will limit certain combinations of instructions executing together. Intensive use of an instruction stack unit (ISU) may also prevent an instruction from going superscalar. Based on the look-ahead logic assessment of what is in the queue, the instruction dispatch logic may be required to decide when instructions may go superscalar according to certain dependency rules. Table I, for example, shows the categories of instructions (based on resources used) that typically can be executed with other instructions in the Java programming environment:

TABLE I

Instruction Conflict Categories

| Stack pushes/no change | Stack pushes and pops (no FP) | | | Stack pushes and pops (FP) | |
|---|---|---|---|---|---|
| aconst_null | bipush | pop | pop2 | dup | fadd | dadd |
| iconst_m1 | sipush | swap | irem | ifge | fsub | dsub |
| iconst_0 | goto | dup_x1 | iadd | | dneg | frem |
| iconst_1 | jsr | ladd | | | drem | fneg |
| inconst_2 | goto_w | if_comple | ifit | | fdiv | fmul |
| iconst_3 | jsr_w | lrem | | | dmul | ddiv |
| inconst_4 | | isub | ineg | | l2f | i2f |
| lconst | | lsub | | | f2l | f2i |
| fconst | | lneg | imul | ishl | f2d | d2f |
| dconst | | lmul | ishr | lshr | fcmpg | fcmpl |
| | | iushr | lushr | | dcmpl | dcmpg |
| | | iand | | | | |
| | | land | ior | lor | | |
| | | ixor | lxor | i2l | | |
| | | i2d | l2d | d2i | | |
| | | l2i | i2b | i2c | | |
| | | i2s | lcmp | ifeq | | |
| | | ifne | ifgt | ifle | | |
| | | if_icmpeq | if_acmpeq | | | |
| | | if_icmpne | if_acmpne | | | |

For instructions involving stack pushes or no change, no read access to the data cache memory, local variable memory, constant pool or stack is required. Some push a value onto the stack or do not change the stack at all, and there typically are no dependency rules for these instructions. However, such instructions may be subject to superscalar lockout (discussed below). Also, while the nop instruction does not affect the stack, the nop is typically treated separately, and is not allowed to go superscalar since it is typically deliberately used to place a space between instructions.

For instructions that incorporate stack pushes and pops and do not require the use of the floating point (FP) logic unit, read access is typically not required to the data cache memory, local variable memory or constant pool, although read (pop) access may be required to the stack. Therefore, these instructions are dependent on a concurrently executing instruction. The dependency rule for these instructions is therefore to execute only if data dependency does not interfere in the older instruction's push to the stack.

For instructions that incorporate stack pushes and pops and also require the use of the floating point (FP) logic unit, these instructions also do not require read access to the data cache memory, local variable memory or constant pool, but they do require read access (pop) to the stack and are governed by the same general rule as above for those instructions that don't use the FP unit. Since the illustrated implementation only uses a single FP unit, however, these instructions are further constrained by a second dependency rule to execute only if the older instruction does not require floating point.

Superscalar Lockout

In addition to the aforementioned look-ahead logic rules, all instructions may also be subject to superscaler lockout rules, which may be as follows:

1. No instructions may go supersclaer if a halt-causing instruction is in the execution (E2) stage.
2. No instruction may go superscalar if a debug (DBG) bit is on in a control register. This permits real-time debuggers to turn off superscalar operations if desired.
3. No instruction may go superscalar if a stack intensive instruction is in decode (DEC) stage. Examples of stack intensive instructions are: dup_x2, dup2_x1, dup2 and dup2_x2. Typically, all four ISU ports will be needed to execute these instructions in three stages.
4. No instruction may go superscalar if a nop instruction is in decode stage.

It will be appreciated that implementation of the aforementioned look-ahead rules would be well within the abilities of one of ordinary skill in the art having the benefit of the instant disclosure. Moreover, implementation of any or all of such rules may be omitted in some embodiments, and additional rules may be implemented in still other embodiments. Other modifications will be apparent to one of ordinary skill in the art having the benefit of the instant disclosure.

Switch Builder

The Java "jump" bytecode class includes two switch bytecodes: lookupswitch and tableswitch. Both instructions are considered complex because the number of operands will vary and this number is only known at runtime. Switch builder block 118 is required to utilize this number to pre-process the instructions on the fly as they are read in by the instruction fetch logic. The instruction formats for the two switch bytecodes are shown in Tables II and III below:

TABLE II

Lookupswitch Instruction Format

| | |
|---|---|
| 0xAB | Lookupswitch bytecode |
| <0–3 byte pad> | 0–3 byte pad to word-align operands with method start address |
| default bytes 1–4 | 32-bit signed default address offset |
| npairs 1–4 | 32-bit signed count of number N of tests embedded in lookupswitch bytecode |
| match1 bytes 1–4 | $1^{st}$ pair 32-bit match integer |
| offset1 bytes 1–4 | $1^{st}$ pair 32-bit signed address offset |
| match2 bytes 1–4 | $2^{nd}$ pair 32-bit match integer |
| offset2 bytes 1–4 | $2^{nd}$ pair 32-bit signed address offset |
| * | |
| * | |
| * | |
| matchN bytes 1–4 | $N^{th}$ pair 32-bit match integer |
| offsetN bytes 1–4 | $N^{th}$ pair 32-bit signed address offset |

TABLE III

Tableswitch Instruction Format

| | |
|---|---|
| 0xAA | Tableswitch bytecode |
| <0–3 byte pad> | 0–3 byte pad to word-align operands with method start address |
| default bytes 1–4 | 32-bit signed default address offset |
| low bytes 1–4 | 32-bit signed start value of test range embedded in tableswitch bytecode |
| high bytes 1–4 | 32-bit signed end value of test range embedded in tableswitch bytecode |
| offset1 bytes 1–4 | $1^{st}$ 32-bit signed address offset, total number of offsets = high − low + 1 |
| offset2 bytes 1–4 | $2^{nd}$ 32-bit signed address offset |
| * | |
| * | |
| * | |

For each type of instruction, prior to execution of the instruction, a key value is pushed onto the top of the stack. In the case of a lookupswitch instruction, the key value is compared against each match value, and if the key matches a match value, the associated offset is used to generate a target address to branch to. In the case of a tableswitch instruction, the key value is compared against each match value between the high and low values, inclusive, and if the key matches a match value, the associated offset is used to generate a target address to branch to. If no match is found in either instruction, the default offset is used to generate the target address. After execution of either instruction, the key value is removed from the stack.

A notable characteristic of each type of instruction is that each varies in size. An instruction that varies in size typically presents a problem to a hardware processor, as instructions that are the same size typically yield the most efficient processor pipeline designs. Both the instruction queue and the execution logic of a processor typically expect instructions to have a finite range of operands.

Therefore, consistent with the invention, the switch builder block 118 of FIG. 3 pre-processes such switch instructions by generating a plurality of smaller, less complex, and fixed size bytecodes that will perform the same function. For example, in the illustrated embodiment, ifeq and dup instructions are used to emulate a switch instruction as a series of conditional branches, with a goto_w instruction used to represent a default branch for the switch instruction.

A conventional ifeq instruction operates by popping the top value off the stack, and using that value as an argument in a test condition that compares the argument to zero. As will be discussed below, the herein-described execution logic may be customized to compare the argument to a value stored in the bytelanes instead of zero. If the argument matches the value (or zero, in the case of a conventional ifeq instruction), a branch is taken to a target address generated from an offset value associated with the instruction (which is typically summed with the address of the ifeq instruction to generate the target address). Otherwise, execution proceeds to the next sequential instruction in the instruction stream.

A dup instruction operates by pushing onto the stack another copy of the top value of the stack, thus effectively duplicating the top value on the stack. A goto_w instruction is an unconditional branch instruction that branches to a target address calculated from an offset value associated with the instruction.

For N tests defined by a switch instruction, the instruction fetch logic generates, in order:

1. The switch instruction bytecode with the size of the instruction in the original instruction stream as the argument.
2. An interleaved sequence of N-1 pairs of dup and ifeq bytecodes, with each ifeq bytecode including as one argument the match value for one of the tests, and as another argument the offset value associated with that match value.
3. An additional ifeq bytecode, including the match value and offset value for the last test defined by the switch instruction.
4. A goto_w bytecode including an unconditional branch to the default address.

Figure 4:
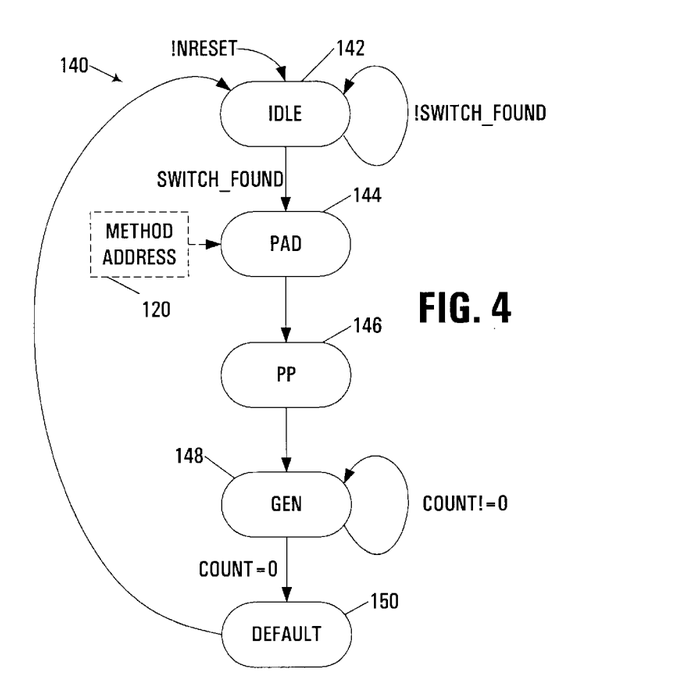
FIG. 4 is a state diagram illustrating the program flow of the switch builder logic of FIG. 3.

Block 118 typically implements switch instruction handling logic via a state machine or other logic that processes a switch instruction detected by the bytecode parser. Once the parser has identified a bytecode as a lookupswitch or tableswitch instruction, the state machine in the switch builder is notified. FIG. 4 illustrates an exemplary state diagram 140 suitable for use by block 118.

State machine 140 may include five states:

IDLE STATE 142: This state is initialized at system reset (e.g., via assertion of the !NRESET signal). State machine 140 may be kept in the IDLE state until a SWITCH_FOUND signal from the parser is activated (e.g., in response to detecting the lookupswitch (0×AB) or tableswitch (0×AA) bytecode).

PAD STATE 144: If this is a lookupswitch bytecode, this state uses the method address 120 to find the 32-bit default address and the 32-bit npairs signed count values and saves these in two scratch registers (not shown). If it is a tableswitch bytecode, the default address and low and high values are saved in three scratch registers. The default address must be found since a 0–3 byte pad is typically inserted between the bytecode and the operands of a tableswitch or lookupswitch instruction to align the operands on a word boundary. In addition, a COUNT variable is initialized in another register (not shown) based upon the number of conditional branches that need to be generated.

PP STATE 146: This state generates the switch bytecode (0×AB for lookupswitch and 0×AA for tableswitch) with one argument containing the length of the instruction, and inserts the instruction in the instruction queue. The operand is the number of bytes following the original lookupswitch bytecode. This is used by the execution unit to update the PC counter.

GEN STATE 148: This state generates N conditional branch instructions (e.g., ifeq instructions) based on the value of a COUNT variable and the type of switch bytecode being a lookupswitch or a tableswitch. Each branch bytecode is followed by a corresponding 32-bit match value and 32-bit offset value in byte lanes 0–7. Moreover, N-1 dup instructions are generated and placed in front of the first N-1 conditional branch instructions. All generated instructions are inserted into the instruction queue, and the COUNT variable is decremented each cycle, until a zero value is reached.

DEFAULT STATE 150: This state generates a single bytecode (goto_w) with the four byte lanes containing the 32-bit default address, upon decrementing of the COUNT variable to zero. This instruction is inserted into the queue, and control is returned to the IDLE state.

The instructions generated by block 118 and placed in the instruction queue will be executed later by the execution unit. Generally, the execution unit employs hardware execution logic for implementing part or all of the Java bytecode instruction set in a similar manner to a software-based Java Virtual Machine, with a few notable exceptions. For example, the execution logic supports the use of the bytelanes filled by the instruction fetch unit, e.g., so that combined instructions will be executed concurrently and/or filled operands will be used instead of stack operations. Moreover, for the purpose of supporting the herein-described switch instruction handling functionality, the execution logic supports specific functionality for handling the ifeq, lookupswitch, and tableswitch bytecodes.

For the ifeq bytecode, the conventional Java instruction set typically limits this instruction to a compare against zero. In the illustrated embodiment, however, the execution logic is configured to retrieve a 32-bit compare value from the first four byte lanes associated with the ifeq instruction. For conventional ifeq instructions, a value of zero is placed in the first four byte lanes by the instruction fetch logic. The conditional branch implemented by the ifeq instruction is then used to pop the top value from the stack and compare that value to the immediate value stored in the first four bytelanes.

In addition, for the switch instruction bytecodes (lookupswitch and tableswitch) the program counter (PC) will have the value of the address of the switch instruction, so the execution logic is configured to use the address of the lookupswitch or tableswitch instruction to calculate the target address for each branch instruction that follows. Moreover, the execution logic is typically configured to use the argument of the switch instruction to increment the PC once the entire emulated switch instruction sequence has been executed. In addition, since the instruction fetch logic generates one or more dup instructions to duplicate the top value on the stack, the execution logic is configured to pop the top value off the stack after executing whatever branch that occurs as a result of the switch operation, be it a default branch or a branch due to a match.

Figure 5:
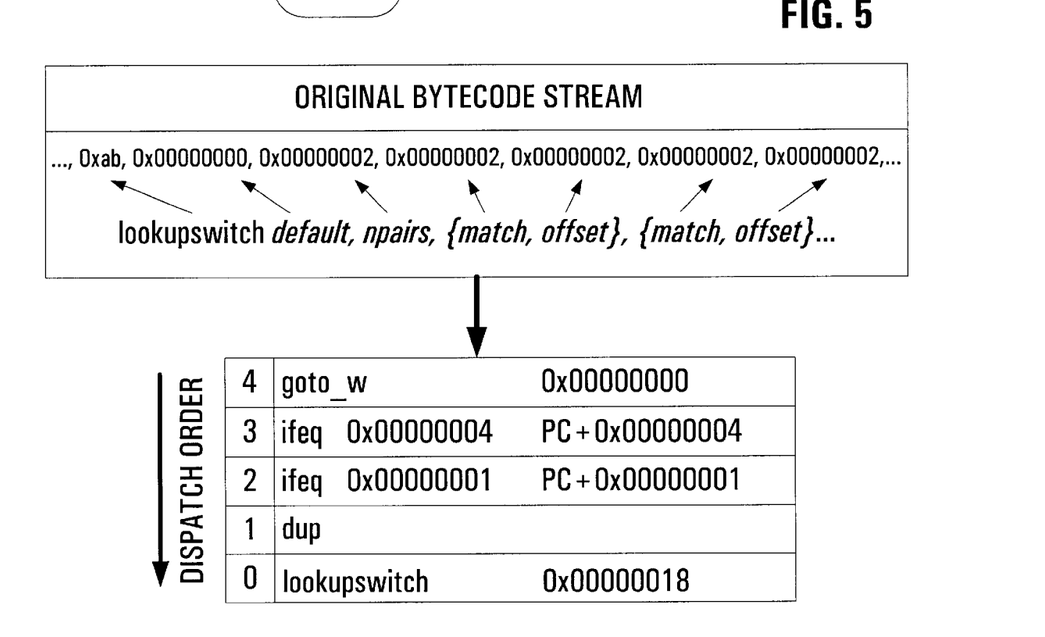
FIG. 5 is a block diagram illustrating the emulation of an exemplary lookupswitch instruction by the switch builder of FIG. 3.
Figure 6:
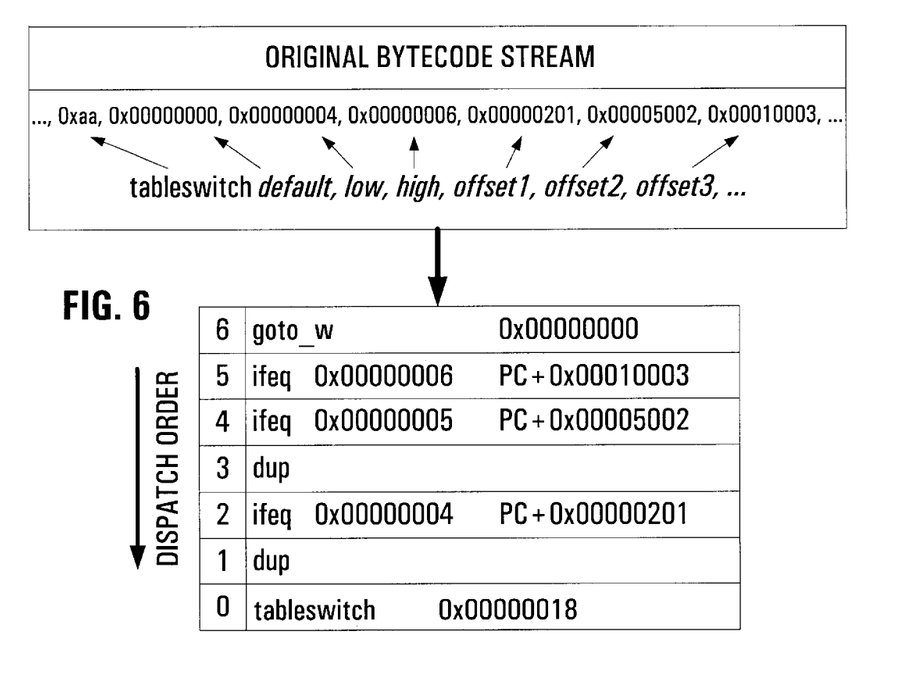
FIG. 6 is a block diagram illustrating the emulation of an exemplary tableswitch instruction by the switch builder of FIG. 3.

As a further illustration of the operation of the herein-described switch instruction handling functionality, FIGS. 5 and 6 respectively illustrate the sequences of bytecodes generated in the emulation of exemplary lookupswitch and tableswitch instructions.

Various modifications may be made to the illustrated embodiments without departing from the spirit and scope of the invention. For example, various alternate bytecode sequences may be generated to emulate a switch instruction consistent with the invention. Different combinations of ifeq, dup and goto_w instructions may be used to emulate a Java switch instruction consistent with the invention. Also, rather than ifeq instructions, other conditional branch instructions such as if_icmpeq instructions (typically incorporating additional push instructions, or customized handling in the execution logic), or combinations of instructions, may be used to perform conditional branches. Further, stack manipulation instructions other than dup instructions may be used to maintain sufficient copies of the key value on the stack. Moreover, the execution logic may be configured to handle operations such as updating the PC, calculating branch target addresses, popping or pushing from or to the stack, retrieving arguments, etc., in other manners than that described herein. For example, the execution logic might be capable of saving a key value responsive to a switch bytecode, and using that value in all subsequent conditional branch instructions without having to modify the stack, which could potentially eliminate the need for dup instructions or other stack manipulation operations.

Figure 7:
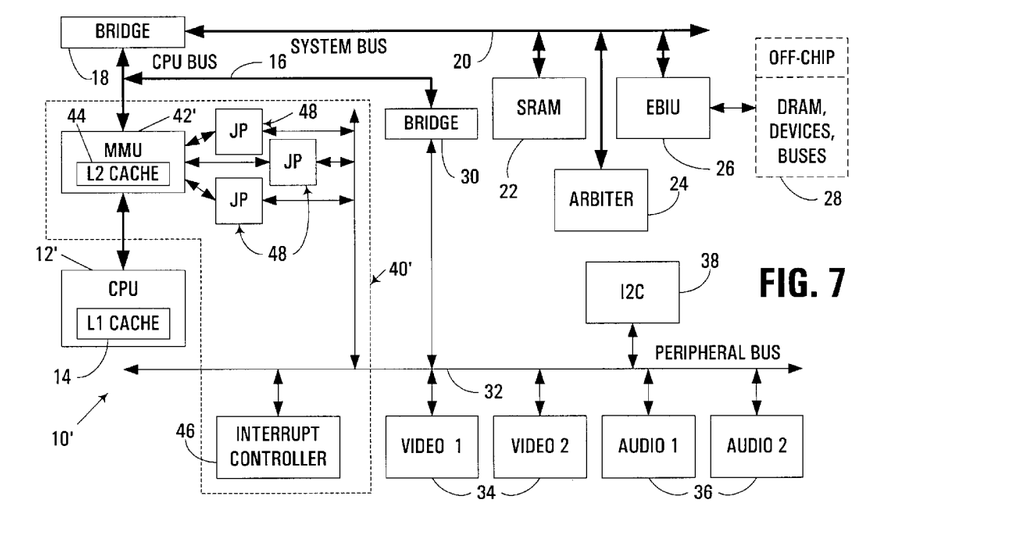
FIG. 7 is a block diagram of an alternate data processing system to that of FIG. 1, and suitable for implementing hardware-based switch instruction emulation consistent with the invention.

Furthermore, the herein-described functionality may be used in other data processing environments consistent with the invention. For example, FIG. 7 illustrates an alternate data processing system 10' including many of the same components as data processing system 10 of FIG. 1, but including an alternate Java accelerator 40' that is directly interposed between the master processor 12' and CPU bus 16. In this implementation, a memory management unit (MMU) 42' implements a direct point-to-point interconnection with the processor, and thus handles memory accesses to the system bus 20 and peripheral bus 32 for all processors 12', 48 in the system. As a result, relatively high clock speeds are possible, and for system bus transactions not involving the L2 cache 44, the L2 cache controller will simply pass data through to the slower system bus. However, in this configuration, the master and Java processors 12' and 48 both have high speed access to Java objects stored in the L2 cache 44 within the MMU 42'.

Other modifications may be made to the illustrated embodiments without departing from the spirit and scope of the invention. Therefore, the invention lies in the claims hereinafter appended.

What is claimed is:

1. A circuit arrangement, comprising:
   (a) execution logic configured to execute a plurality of instructions defined by an instruction set, the instruction set defining at least one conditional branch instruction and at least one switch instruction, wherein the execution logic is configured to execute the conditional branch instruction;
   (b) instruction fetch logic configured to fetch instructions defined by the instruction set for execution by the execution logic; and
   (c) switch instruction handling logic configured to process a switch instruction fetched by the instruction fetch logic by generating a plurality of conditional branch instructions for execution by the execution logic to emulate the fetched switch instruction.

2. The circuit arrangement of claim 1, wherein the fetched switch instruction is configured to test a key value stored on a stack, wherein the conditional branch instruction is associated with a test condition that relies on at least one argument stored on the stack, wherein the execution logic is configured to execute the conditional branch instruction by popping the argument off the stack and applying the test condition to the argument, and wherein the switch instruction handling logic is configured to generate at least one stack manipulation instruction defined by the instruction set for execution by the execution logic to duplicate the key value on the stack based upon the number of conditional branch instructions generated by the switch instruction handling logic to emulate the fetched switch instruction.

3. The circuit arrangement of claim 2, wherein the fetched switch instruction defines N tests, and wherein the switch instruction handling logic is configured to generate N conditional branch instructions and N-1 stack manipulation instructions to emulate the fetched switch instruction.

4. The circuit arrangement of claim 3, wherein each conditional branch instruction comprises a Java ifeq instruction, and wherein each stack manipulation instruction comprises a Java dup instruction.

5. The circuit arrangement of claim 4, further comprising an instruction queue including a bytecode lane and a plurality of bytelanes, wherein the switch instruction handling logic is configured to forward each ifeq instruction to the bytecode lane of the instruction queue, and to associate a match value with each ifeq instruction by forwarding the match value to at least one bytelane, and wherein the execution logic is configured to execute each ifeq instruction by comparing a value popped from the stack for equality with the match value associated therewith.

6. The circuit arrangement of claim 3, wherein the switch instruction handling logic is further configured to generate a switch instruction bytecode for execution by the execution logic, the switch instruction bytecode having associated therewith an instruction size value associated with the size of the fetched switch instruction, and wherein the execution logic is configured to process the switch instruction bytecode by updating a program counter based upon the instruction size value associated with the switch instruction bytecode.

7. The circuit arrangement of claim 3, wherein the execution logic is further configured to pop a remaining copy of the key value off of the stack prior to completing emulation of the fetched switch instruction.

8. The circuit arrangement of claim 1, wherein the fetched switch instruction further defines a default branch address, and wherein the switch instruction handling logic is further configured to generate an unconditional branch instruction to be executed if none of the conditional branch instructions are taken during execution.

9. The circuit arrangement of claim 1, wherein the fetched switch instruction comprises a Java tableswitch instruction that specifies a range of match values bounded by a low value L and a high value H, the Java tableswitch instruction further specifying (H−L+1) branch offset values, each associated with a match value from the range of match values, and wherein the switch instruction handling logic is configured to generate (H−L+1) conditional branch instructions, each conditional branch instruction configured to compare a key value against an associated match value, and in response to a match to branch to a target address generated using the associated offset value.

10. The circuit arrangement of claim 1, wherein the fetched switch instruction comprises a Java lookupswitch instruction that specifies N match offset pairs, each match offset pair specifying a match values and an associated offset value, and wherein the switch instruction handling logic is configured to generate N conditional branch instructions, each associated with a match offset pair, and each configured to compare a key value against an associated match value, and in response to a match to branch to a target address generated using the associated offset value.

11. An integrated circuit device comprising the circuit arrangement of claim 1.

12. A data processing system comprising the circuit arrangement of claim 1.

13. A program product, comprising a hardware definition program that defines the circuit arrangement of claim 1; and a signal bearing media bearing the hardware definition program.

14. The program product of claim 13, wherein the signal bearing media includes at least one of a transmission type media and a recordable media.

15. A method of accelerating execution of a switch instruction by a hardware circuit arrangement, the switch instruction defined by an instruction set that further defines at least one conditional branch instruction, and the circuit arrangement including hardware execution logic configured to execute the conditional branch instruction, the method comprising:

(a) fetching a switch instruction from an instruction stream; and (b) emulating the fetched switch instruction by generating a plurality of conditional branch instructions and executing the plurality of conditional branch instructions using the hardware execution logic.

16. The method of claim 15, wherein the fetched switch instruction is configured to test a key value stored on a stack, wherein the conditional branch instruction is associated with a test condition that relies on at least one argument stored on the stack, wherein executing a conditional branch instruction includes popping the argument off the stack and applying the test condition to the argument, and wherein emulating the fetched switch instruction further comprises generating and executing with the hardware execution logic at least one stack manipulation instruction defined by the instruction set to duplicate the key value on the stack based upon the number of generated conditional branch instructions.

17. The method of claim 16, wherein the fetched switch instruction defines N tests, and wherein emulating the fetched switch instruction includes generating N conditional branch instructions and N-1 stack manipulation instructions.

18. The method of claim 17, wherein each conditional branch instruction comprises a Java ifeq instruction, and wherein each stack manipulation instruction comprises a Java dup instruction.

19. The method of claim 18, wherein the hardware circuit arrangement further includes an instruction queue including a bytecode lane and a plurality of bytelanes, wherein emulating the fetched switch instruction further includes:

(a) forwarding each ifeq instruction to the bytecode lane of the instruction queue, and associating a match value with each ifeq instruction by forwarding the match value to at least one bytelane; and (b) executing each ifeq instruction by comparing a value popped from the stack for equality with the match value associated therewith.

20. The method of claim 17, wherein emulating the fetched switch instruction further includes:

(a) generating a switch instruction bytecode having associated therewith an instruction size value associated with the size of the fetched switch instruction;

(b) processing the switch instruction bytecode with the hardware execution logic by updating a program counter based upon the instruction size value associated with the switch instruction bytecode;

(c) popping a remaining copy of the key value off of the stack prior to completing emulation of the fetched switch instruction; and (d) generating an unconditional branch instruction to be executed if none of the conditional branch instructions are taken during execution, the unconditional branch instruction including a default branch address derived from the fetched switch instruction.

21. The method of claim 15, wherein the fetched switch instruction comprises a Java tableswitch instruction that specifies a range of match values bounded by a low value L and a high value H, the Java tableswitch instruction further specifying (H−L+1) branch offset values, each associated with a match value from the range of match values, and wherein emulating the fetched switch instruction includes generating (H−L+1) conditional branch instructions, each conditional branch instruction configured to compare a key value against an associated match value, and in response to a match to branch to a target address generated using the associated offset value.

22. The method of claim 15, wherein the fetched switch instruction comprises a Java lookupswitch instruction that specifies N match offset pairs, each match offset pair specifying a match values and an associated offset value, and wherein emulating the fetched switch instruction includes generating N conditional branch instructions, each associated with a match offset pair, and each configured to compare a key value against an associated match value, and in response to a match to branch to a target address generated using the associated offset value.

23. A circuit arrangement, comprising:
(a) execution logic configured to execute a plurality of Java bytecodes defined by the Java instruction set, including an ifeq instruction, a dup instruction and a goto_w instruction;
(b) instruction fetch logic configured to fetch a Java switch instruction selected from the group consisting of a Java lookupswitch instruction and a Java tableswitch instruction for execution by the execution logic; and
(c) switch instruction handling logic configured to emulate the fetched switch instruction by generating a combination of ifeq, dup and goto_w instructions for execution by the execution logic.

24. A method of accelerating execution of a Java switch instruction selected from the group consisting of a Java tableswitch instruction and a Java lookupswitch instruction, the method comprising:
(a) fetching the Java switch instruction;
(b) generating a combination of Java ifeq, dup and goto_w instructions that emulate the Java switch instruction; and
(c) emulating execution of the Java switch instruction by executing the combination of Java ifeq, dup and goto_w instructions using hardware execution logic configured to execute the ifeq, dup, and goto_w instructions.

* * * * *